United States Patent [19]

Jones et al.

[11] 3,780,938

[45] Dec. 25, 1973

[54] METHOD AND APPARATUS FOR RECORDING DATA BY PERFORATING RECORD MEDIA

[75] Inventors: John E. Jones, Winnetka; Orville T. Knutson, Antioch, both of Ill.

[73] Assignee: Cummins-Allison Corp., Glenview, Ill.

[22] Filed: Jan. 31, 1972

[21] Appl. No.: 222,184

[52] U.S. Cl. .......................... 234/1, 83/262, 234/63, 234/128

[51] Int. Cl. .......................... G06k 1/04

[58] Field of Search .................. 83/262, 365; 234/1, 234/128, 63

[56] References Cited

UNITED STATES PATENTS

| | | | |
|---|---|---|---|
| 3,037,690 | 6/1962 | Tailleur | 83/262 X |
| 2,862,555 | 12/1958 | Jurgens et al. | 234/128 X |
| 1,486,561 | 3/1924 | Belisle | 83/262 X |
| 2,968,982 | 1/1961 | Cousino | 83/262 |
| 2,674,308 | 4/1954 | Knobel | 83/262 X |
| 3,469,480 | 9/1969 | Nassenstein et al. | 83/365 X |
| 3,275,232 | 9/1966 | Quinn et al. | 234/128 X |

*Primary Examiner*—J. M. Meister
*Attorney*—C. Frederick Leydig et al.

[57] ABSTRACT

A system for perforating record media by the use of "stationary" perforating equipment, i.e., in which the punches do not move in the direction of movement of the record media. The record media is transported through the perforating equipment by frictionally engaging the surfaces of the record media with a plurality of continuously driven rollers. The continuous frictional drive applied to the record media is maintained during the perforating of the record media to obtain high throughput rates. The frictional drive rollers are skewed so as to urge the media against an inturned flange on one side of the media supporting surface. A photoelectric sensor senses the position of the record media for actuating the punches only when media is present at the perforating station.

13 Claims, 8 Drawing Figures

METHOD AND APPARATUS FOR RECORDING DATA BY PERFORATING RECORD MEDIA

DESCRIPTION OF THE INVENTION

The present invention relates to an improved method and apparatus for recording data on record media by perforating the media.

It is a primary object of the present invention to provide an improved method and apparatus for recording data on record media at high throughput rates and at a relatively low cost.

A further object of the present invention is to provide an improved method and apparatus of the foregoing type which provides data perforations which enable the encoded media to be accurately read and sorted by automatic reading and sorting equipment.

It is another object of the invention to provide such an apparatus which can be economically manufactured and maintained.

Other objects and advantages of the invention will be apparent from the following detailed description taken in connection with the accompanying drawings, in which.

While the invention will be described in conection with certain preferred embodiments, it will be understood that it is not intended to limit the invention to these particular embodiments. On the contrary, it is intended to cover all alternatives, modifications and equivalent arrangements as may be included within the spirit and scope of the invention.

Figure 1:
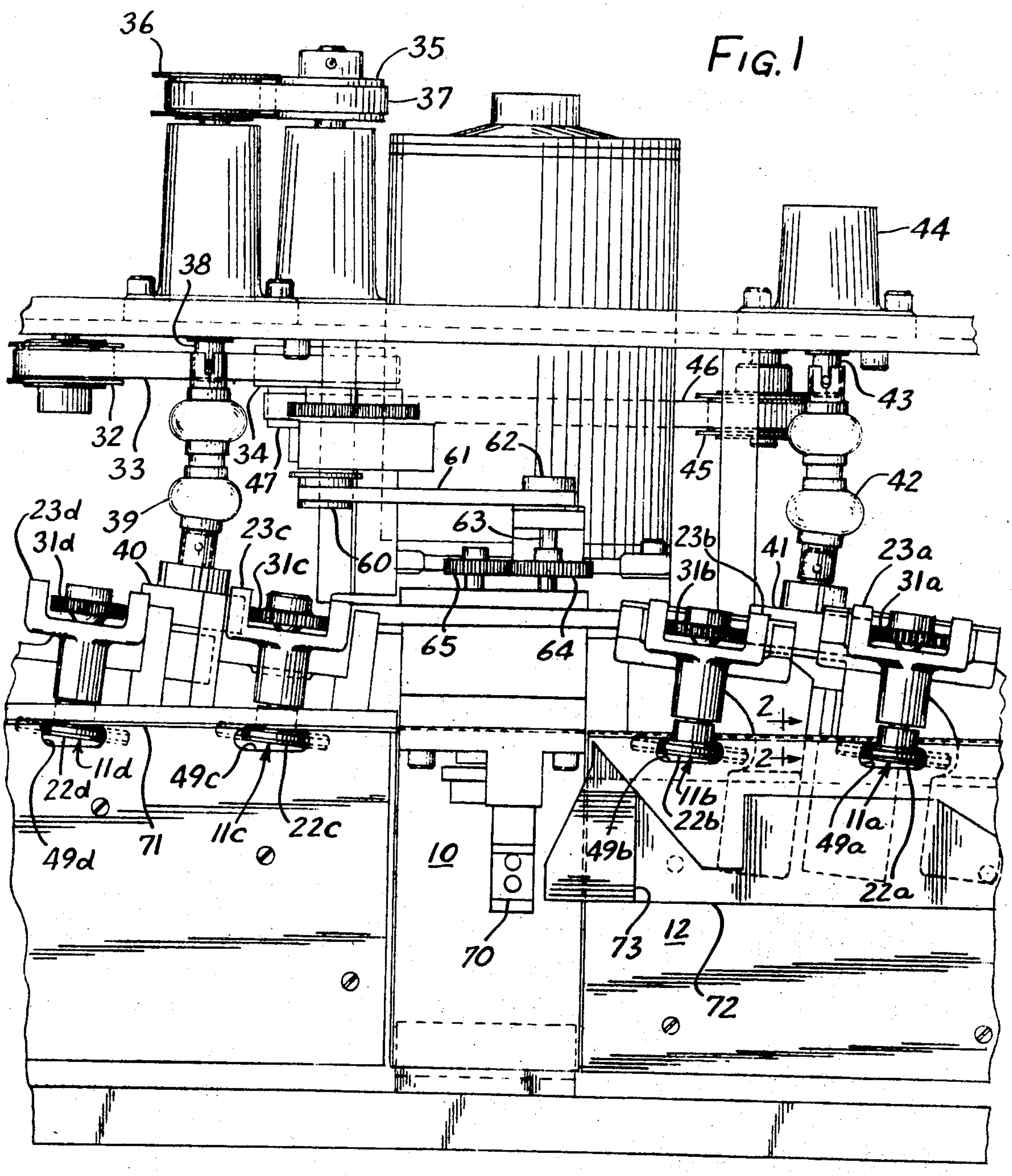
FIG. 1 is a top plan view of data encoding apparatus embodying the present invention.
Figure 2:
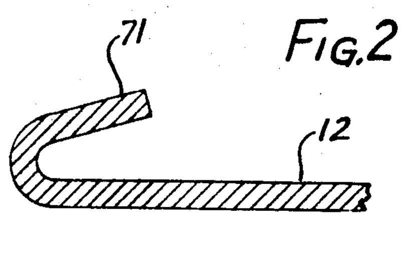
FIG. 2 is a section taken along line 2—2 in FIG. 1.
Figure 3:
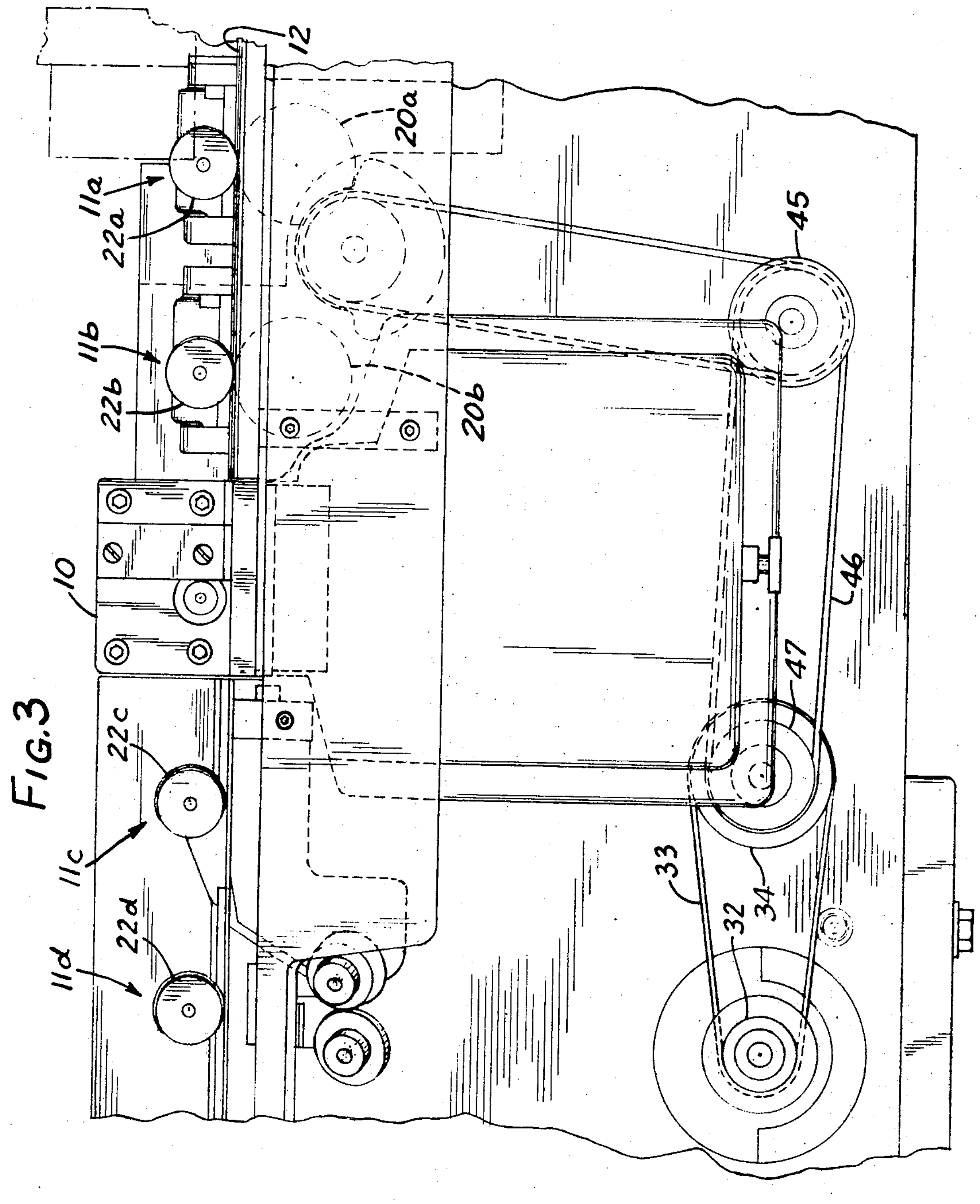
FIG. 3 is a side elevation of the apparatus shown in FIG. 1.
Figure 8:
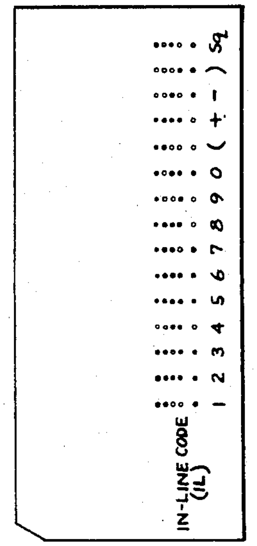
FIG. 8 shows the representation of 15 exemplary characters in an in-line perforated code.

Turning now to the drawings and referring first to FIGS. 1 and 3, there is shown a perforating system for recording data on record media by perforating the media. The perforations formed in the record media may record the data in any desired format, legible or illegible, coded or uncoded. One exemplary format for the perforations is that of the "in-line" perforated code, in which characters are represented by illegible, in-line coded perforations. As shown by the illustrative characters in FIG. 8, each in-line perforation field consists of a single vertical row of perforation stations. Each of these perforations stations is a significant location, i.e., the presence or absence of perforations in different combinations of $m$ levels (here $m$ equals 5) of a single line can, according to a predetermined code, represent any one of a number of different characters. As shown in FIG. 8, the numerical character 1 is represented by perforations at levels 2 and 5 in a given line. The numerical characters 2 or 3 are represented by perforations at levels 1, 5, and 1, 2, 4, 5 respectively. The other combinations of perforation locations to represent different numerical characters will be evident from FIG. 8. Plus or minus symbols may also be represented by perforations in the locations shown. The spacing of the in-line indicia columns and rows, i.e., both the horizontal and vertical spacing, is typically 0.100 inch center-to-center. Other suitable formats for the perforations are well known in the art and examples thereof are described in more detail in U.S. Pat. No. 3,558,859 to Dilsner et al., for example. The record media that is perforated may be in the form of discrete documents, such as checks, remittance slips and the like, or a more continuous media such as paper tape or the like.

One of the principal advantages of the present invention is that it fulfills all of the aforementioned objectives with the use of stationary punch equipment, i.e., a single row of punches that are driven perpendicularly through the record media (in automatically selected combinations) into a stationary die. This is in contrast to "moving" punch equipment, such as that shown, for example, in U.S. Pat. No. 3,119,295 to Dreyer and assigned to the assignee of this invention. The moving punches move in the same direction as the record media while the media is being punched, while the stationary punches never move in the direction of media movement. The moving punch equipment is extremely complex and expensive because it requires a multiplicity, typically 20 or more, of rows of punches arranged in a cylindrical array which is moved along with the record media being perforated. A corresponding cylindrical array of dies is also moved along with the record media on the opposite side thereof from the punches. Moreover, because of the multiplicity of rows of punches, the encoding of data by means of moving punch equipment would require a control system for actuating only the one particular row of punches that is facing the record media at the instant when the perforating is to occur; this would not only represent an added cost, but would also lead to physical design and maintenance problems because of the necessity of connecting the control system with a moving array of punch rows.

In accordance with one important aspect of the present invention, the record media is continuously driven through the stationary perforating station while the media is being perforated to record data thereon. More particularly, the surfaces of the record media are continuously frictionally engaged by continuously driven conveyor means while the media is being perforated so that there is a continuous flow of record media through the perforating station, thereby providing high throughput rates. Thus, in FIGS. 1 and 3, the record media is transported through a stationary perforating station 10 by means of a plurality of driven friction roller assemblies 11a, 11b, 11c, and 11d mounted so that the nips of the rollers are aligned with the surface of a track or table 12 that supports the media on both the inlet and outlet sides of the perforating station 10.

Figures 4, 5:
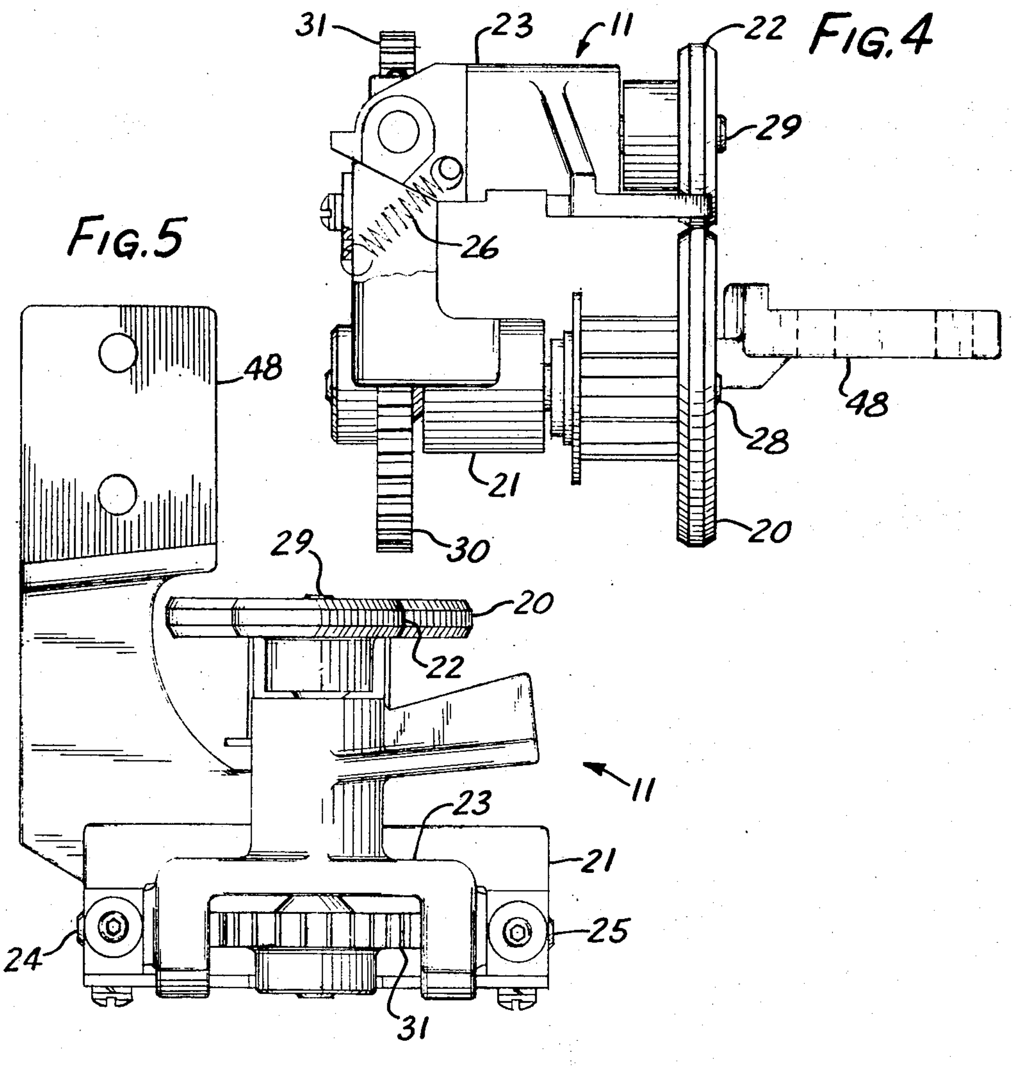
FIG. 4 is an end elevation of one of the driven roller assemblies in the apparatus of FIGS. 1 and 3.
FIG. 5 is a top plan view of the roller assembly of FIG. 4.
Figure 6:
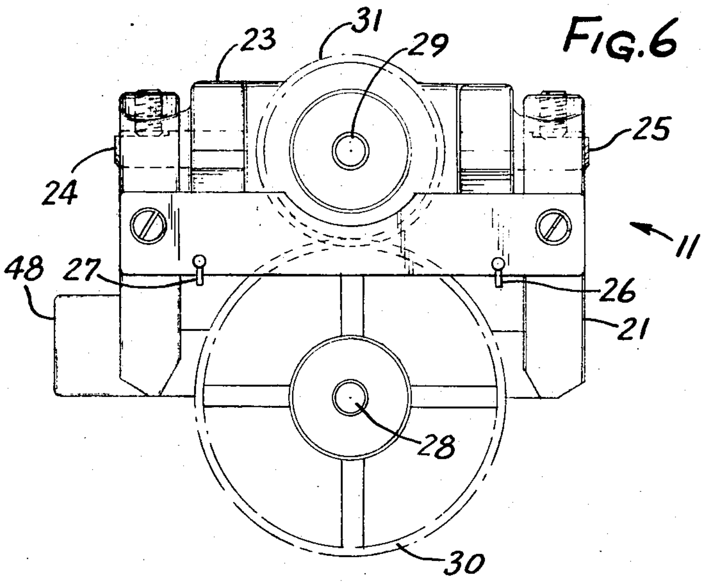
FIG. 6 is a side elevation of the roller assembly of FIGS. 4 and 5.

The roller assemblies 11*a*–11*d* are of identical construction, and it will be helpful to describe one of these assemblies in detail before proceeding with the description of the overall perforating system. Thus, referring to FIGS. 4, 5, and 6, each roller assembly 11 includes a lower nylon roller 20 journalled in a stationary frame 21 and an upper nylon roller 22 journalled in a movable frame 23 that is pivotally connected to the stationary frame 21 by means of a pair of horizontal pins 24 and 25. The upper roller 22 is biased downwardly against the lower roller 20 by means of a pair of biasing springs 26 and 27 connected between the two frame members 21 and 23.

For the purpose of driving the rollers 20 and 22, the respective shafts 28 and 29 thereof extend rearwardly through the respective frames 21 and 23 and are secured to corresponding gears 30 and 31 on the rear side of the roller assembly. The two gears 30 and 31 mesh with each other so that the upper gear 31 and its roller 22 are driven in response to driving of the lower gear 30.

The lower gear 30 is driven through a drive train which begins with a motor driven pulley 32 (FIGS. 1 and 3). The pulley 32 is connected via a drive belt 33 to a pulley 34 which drives a shaft connected to a pulley 35. The pulley 35 drives a pulley 36 via belt 37, and the shaft 38 of pulley 36 is connected via a universal joint 39 to a gear 40 which meshes with the lower gears 30 of two adjacent roller assemblies 11*c* and 11*d*. The two roller assemblies 11*a* and 11b are driven in a similar fashion by a gear 41 connected via a universal joint 42 to a shaft 43. The shaft 43 in turn is driven through a gear box 44 connected to a pulley 45 driven by a belt 46 from a pulley 47. The pulley 47 is driven by the same belt which drives the pulley 34 in the drive train leading to the other two roller assemblies 11*c* and 11*d*. Consequently, it can be seen that all four roller assemblies 11*a*–11*d* are continuously driven through the drive system which originates with the motor driven pulley 32.

The four roller assemblies 11*a*–11*d* are mounted at intervals along the side of the table 12 via mounting flanges 48 formed as integral parts of the lower frame member of each roller assembly. The roller assemblies are mounted with the upper rollers 22 disposed above the surface of the table 12 and the lower rollers 20 disposed below the table surface, with the two rollers 20 and 22 of each assembly engaging each other through registered openings 49*a*, 49*b*, 49*c* and 49*d* formed in the table 12.

As the record media is fed along the surface of the table 12, the leading edge of the media enters the nip of the two engaging rollers 20 and 22 of the first roller assembly 11*a* and is frictionally driven by the rollers from right to left as viewed in FIG. 1. As the media is advanced along the surface of the table 12, it passes through the successive nips of the roller assemblies 11*b*, 11*c* and 11*d* so that it is continuously driven by frictional engagement with the continuously driven rollers as it passes through the perforation station.

Figure 7:
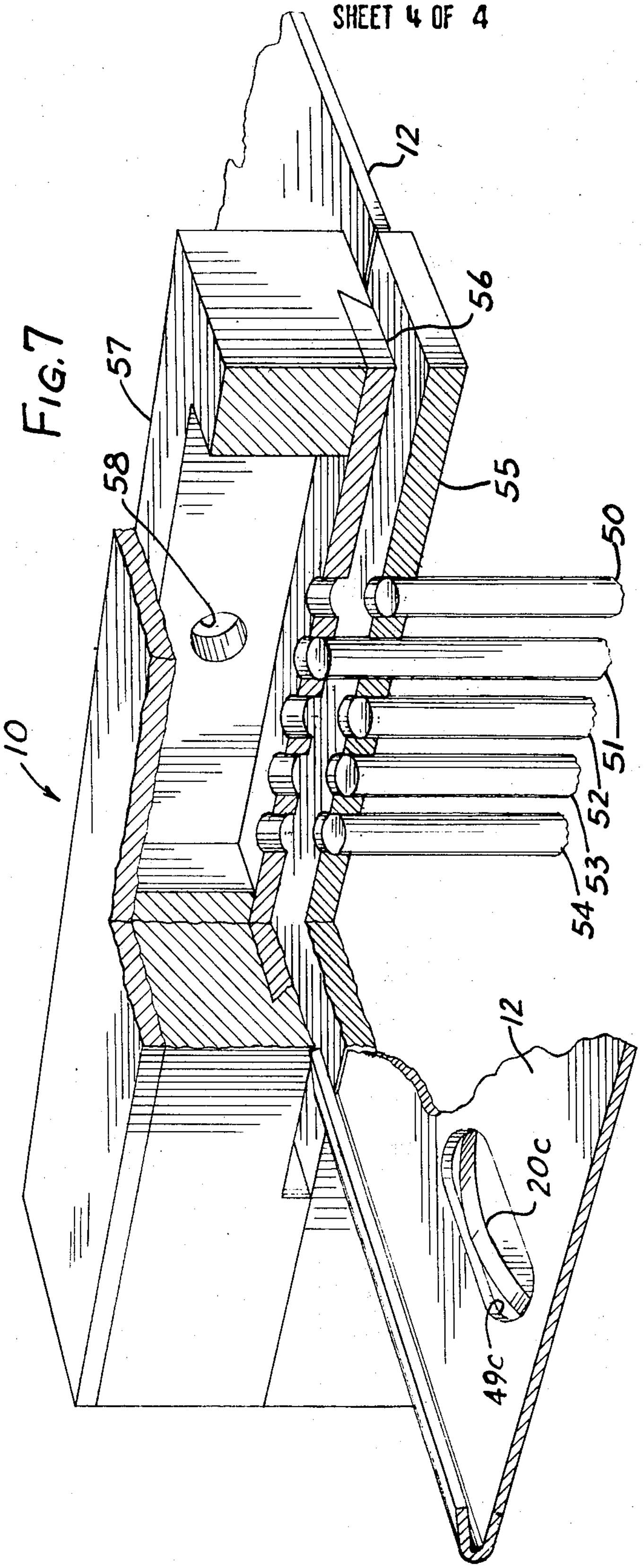
FIG. 7 is an enlarged perspective view, with fragments broken away to show the internal structure, of the perforating head in the apparatus of FIGS. 1 and 3.

As the record media passes through the perforation station, data is recorded on the record media by successively perforating the media with the single row of punches 50–54 shown in FIG. 7. The punches 50–54 are part of a conventional stationary type perforating head, one example of which is the Tally T–1200 Paper Tape Perforator manufactured by Tally Corporation, Seattle, Wash. Automatic selection of one or more of the punches 50–54 for each perforating stroke thereof is accomplished by control systems well known in the art. As the selected punches 50–54 are driven upwardly through the punch-holder 55 they pass through the record media and on through registered openings in the punch die 56, shearing chads from the record media. The chads are withdrawn from the heads of the punches as they enter a vacuum chamber formed directly above the punch die 56 by the die holder 57, and the chads are then withdrawn from the vacuum chamber through an aperture 58 leading to a suitable chad collection means. It will be understood that the perforating head shown in FIG. 7 is of the stationary type because there is no movement of any of the perforating equipment in the direction of movement of the record media; that is, the only movement within the perforating head is the vertical movement of the punches 50–54, which is normal to the direction of movement of the record media.

As illustrated in FIG. 1, the movement of the punches 50–54 within the perforating station may be synchronized with the drive system associated with the roller assemblies 11*a*–11*d* for driving the record media. More specifically, the shaft which drives pulleys 34 and 47 also drives a pulley 60 which is connected via belt 61, pulley 62, shaft 63, and gears 64 and 65 to the perforating head.

In accordance with a further aspect of this invention, sensing means responsive to the record media are associated with the perforating head for sensing the position of the record media relative to the perforating station, and this sensing means is operatively connected to the perforating station for actuating the punching mechanism when the record media is present at the perforating station. Thus, referring to FIG. 1, a photoelectric sensor 70 is mounted in an aperture formed in the table 12 in the vicinity of the perforating station for sensing the presence or absence of record media. This photoelectric sensor 70 is connected to the perforating head through conventional control means so as to actuate the punches only when record media is present at the perforating station.

It will be appreciated at this point that the record media is driven continuously while it is being perforated at the perforating station. There is no repetitive starting and stopping of the record media, in spite of the fact that the perforating equipment is stationary, i.e., does not move in the direction of the record media. With this continuous-drive stationary-punch arrangement, it has been found that either discrete or continuous forms of record media can be punched at throughout rates of at least 60 inches per second, with a punching frequency of at least two characters per inch, or 120 characters per second. Moreover, the positioning of the perforations is extremely accurate in the transverse direction; in the machine direction the positioning of the perforations may be somewhat irregular, but this does not prevent the encoded media from being read and sorted automatically by modern sorting and reading equipment which uses photoelectric sensing elements to determine the location of the perforations in the machine direction.

In accordance with another particular aspect of the present invention, the driven rollers which provide the frictional drive for the record media are oriented at an angle other than a right angle with respect to the direction of movement of the record media so that the rollers are skewed relative to the side edges of the record media to urge the media toward one side as it is passed through the perforating station. Thus, as can be seen most clearly in FIG. 1, the four roller assemblies 11*a*–11*d* are skewed at an angle of 6° relative to the direction of movement of the record media, i.e., relative to the side edge of the table 12. This skewing of the frictional drive rollers continuously urges the record media toward the right side of the table 12, where the side edge of the advancing media engages an inturned flange 71 formed on the side edge of the table. The flange 71 extends upwardly and inwardly over the edge portion of the table 12 so as to hold the guided edge of the media down against the surface of the table 12.

As another feature of the invention, a retaining plate rests on top of the record media as the media is transported over the supporting surface 12 so as to hold the main body portion of the record media down against the supporting surface. Thus, a thin flexible plate 72 (see FIG. 1), made of sheet metal for example, is disposed on top of the record media so as to prevent the media from floating off the surface of the table 12. This retaining plate 72 is secured on the top side thereof at its extreme right end (not shown) and carries a weight 73 at its extreme left end, as viewed in FIG. 1, so as to hold the plate 72 down against the record media while at the same time permitting freely flowing movement of the record media along the surface of the table 12 in the longitudinal direction.

As can be seen from the foregoing detailed description, this invention provides a method and apparatus for perforating record media, either in the form of discrete documents or in the form of continuous paper tape, at high throughput rates by applying a continuous frictional drive to the record media as it is passed through the stationary perforating station. The stationary perforating station can be provided at a substantially lower cost than a moving punch arrangement, and the entire perforating system provided by this invention can be economically manufactured and maintained. Furthermore, the data perforations can be located at predetermined positions in both the machine and transverse directions with a sufficient degree of accuracy to enable the encoded media to be accurately read and sorted by reading and sorting equipment.

We claim as our invention:

1. Apparatus for recording data on record media comprising the combination of a stationary perforating station for recording data on the record media by perforating the media, said perforating station comprising a single row of punches mounted on one side of the record media for movement through the media and a stationary die on the other side of the record media for receiving the punches passed through the media, means for supporting and guiding the record media along a fixed constant flow path which extends through said perforating station and is continuously open in the direction of media movement to permit the continuous flow of record media through said perforating station without any interruption in the media flow path other than the punches that effect perforations at the perforating station conveyor means for frictionally engaging the surfaces of the record media for driving the media along said fixed open flow path through said perforating station and drive means connected to said conveyor means for continuously driving said conveyor means at a constant speed, the continuous driving of said conveyor means being maintained during the perforating of said record media at said perforating station so that said record media is continuously frictionally driven along said fixed open flow path even during the perforating thereof.

2. Apparatus as set forth in claim 1 wherein said driven conveyor means comprises a plurality of driven rollers frictionally engaging the surfaces of said record media.

3. Apparatus as set forth in claim 2 wherein said driven rollers comprise a plurality of pairs of opposed rollers biased toward each other on opposite sides of the record media.

4. Apparatus as set forth in claim 2 wherein said rollers are mounted for rotation about an axis oriented at an angle other than a right angle with respect to the direction of movement of the record media so that said rollers are skewed relative to the side edges of said record media to urge the media toward one side.

5. Apparatus as set forth in claim 4 which includes an elongated surface for supporting the record media during movement of the media toward and away from said perforating station, and said pairs of rollers are spaced along said supporting surface to drive the record media along said surface while urging said media toward one side of said surface.

6. Apparatus as set forth in claim 5 which includes a flange along the side of the supporting surface toward which the media is urged so as to guide said media along a straight line to accurately position said media in the transverse direction at said perforating station.

7. Apparatus as set forth in claim 6 in which said flange is turned in over said supporting surface to restrain vertical movement of said record media.

8. Apparatus as set forth in claim 5 which includes a retaining plate resting on top of the record media transported over said supporting surface to hold said media down against said supporting surface.

9. Apparatus as set forth in claim 1 which includes sensing means responsive to the record media for sensing the position of said media relative to said perforating station, said sensing means being operatively connected to said perforating station for actuating said punches when the record media is present at said perforating station.

10. Apparatus as set forth in claim 9 wherein said sensing means is a photoelectric sensing means.

11. A method of recording data on record media comprising the steps of providing a perforating station comprising a single row of punches mounted on one side of the record media for movement through the media and a stationary die on the other side of the record media for receiving the punches passed through the media, continuously driving the record media through said perforating station by continuously frictionally engaging the surfaces of the record media with driven conveyor means while supporting and guiding the record media along a fixed constant flow path which extends through the perforating station and is continuously open in the direction of media movement to permit the continuous flow of record media through the perforating station without any variation of the media flow path and without any interruption in the media flow path other than the punches that effect perforations at the perforating station, and recording data on the record media by perforating said media with said punches at said perforating station while continuing the driving of said record media along said fixed open flow path by means of said driven conveyor means frictionally engaging the surfaces of said media.

12. A method as set forth in claim 11 which includes the step of sensing the position of said record media relative to said perforating station and actuating the punches at said perforating station when the record media is present at said perforating station.

13. A method as set forth in claim 11 which includes the step of continuously urging said record media toward one side thereof while guiding said one side along a straight line so as to accurately position said media in the transverse direction at said perforating station.

* * * * *